(12) United States Patent
Zeffiro et al.

(10) Patent No.: US 12,305,114 B2
(45) Date of Patent: May 20, 2025

(54) SOLVENT-BASED ASPHALTITE SUSPENSIONS

(71) Applicant: LAMBERTI SPA, Albizzate (IT)

(72) Inventors: Alberto Zeffiro, Sugar Land, TX (US); Andrea Balestrini, Sugar Land, TX (US); Sama Nazar Makiah, Richmond, TX (US)

(73) Assignee: LAMBERTI SPA, Albizzate (IT)

( * ) Notice: Subject to any disclaimer, the term of this patent is extended or adjusted under 35 U.S.C. 154(b) by 0 days.

(21) Appl. No.: 18/701,817

(22) PCT Filed: Oct. 28, 2022

(86) PCT No.: PCT/EP2022/080182
§ 371 (c)(1),
(2) Date: Apr. 16, 2024

(87) PCT Pub. No.: WO2023/078793
PCT Pub. Date: May 11, 2023

(65) Prior Publication Data
US 2025/0115800 A1 Apr. 10, 2025

(30) Foreign Application Priority Data
Nov. 3, 2021 (IT) .......................... 102021000028046

(51) Int. Cl.
*C09K 8/035* (2006.01)
(52) U.S. Cl.
CPC .................................... *C09K 8/035* (2013.01)
(58) Field of Classification Search
CPC .......... C09K 8/524; C09K 8/504; C09K 8/66; C09K 8/84; Y10S 507/93
See application file for complete search history.

(56) References Cited

U.S. PATENT DOCUMENTS

| 4,001,125 A | 1/1977 | Newton, III |
| 4,711,733 A | 12/1987 | Kanda et al. |
| 4,915,174 A * | 4/1990 | Berrod ..................... C09K 8/08 166/305.1 |
| 5,114,597 A | 5/1992 | Rayborn et al. |
| 5,942,467 A | 8/1999 | Rayborn, Sr. |
| 6,194,472 B1 | 2/2001 | Logaraj et al. |
| 2002/0193256 A1 | 12/2002 | Harris, Jr. |
| 2004/0127368 A1 | 7/2004 | Rayborn |

FOREIGN PATENT DOCUMENTS

| WO | 2012/137081 A1 | 10/2012 |
| WO | 2019/081534 A1 | 5/2019 |
| WO | 2020/216872 A1 | 10/2020 |
| WO | 2023/078793 A1 | 5/2023 |

OTHER PUBLICATIONS

ISR-WO dated Feb. 13, 2023 for parent matter PCT/EP/2022/080182 (WO2023/078793).

* cited by examiner

*Primary Examiner* — Aiqun Li
(74) *Attorney, Agent, or Firm* — Vorys, Sater, Seymour and Pease, LLP

(57) ABSTRACT

Solvent-based suspensions of asphaltite comprising a carrier fluid, an asphaltite powder and a suspending agent, wherein said suspending agent is a copolymer of a monoethylenically unsaturated monomer containing a carboxylic group and of a $C_1$-$C_8$ (meth)acrylic acid alkyl ester; subterranean treatment fluid containing the solvent-based suspensions of asphaltite and method for treating a subterranean formation by use of the subterranean treatment fluid.

10 Claims, No Drawings

SOLVENT-BASED ASPHALTITE SUSPENSIONS

The present invention relates to novel solvent-based suspensions of asphaltite and to subterranean treatment fluids comprising said asphaltite suspensions.

BACKGROUND OF THE INVENTION

Asphaltite is a naturally occurring hard, solid hydrocarbons that are rich in asphaltenes and nitrogen compounds. Common asphaltite includes (but are not limited to) uintaite (which is usually sold as Gilsonite® from American Gilsonite Company, USA), glance pitch (or manjak) and grahamite. Asphaltite is used in various sector, primarily in the ink, oil and gas, asphalt and foundry industry and in a wide variety of chemical products.

In the oil and gas industry, asphaltite is mainly used in drilling fluid and as cement additive. In drilling fluids, asphaltite helps control fluid loss, stabilize shales, and increase wellbore stability. In cementing operations, asphaltite reduces oil well cement slurry weight and control free water. After asphaltite-containing cement has set, asphaltite increases cement flexibility, reduce cracking, and strengthen cement bonding to the formation.

Conventionally, asphaltite is processed, transported, and used in its solid form, mainly as fine powder. However, many industries use asphaltites as additives for various aqueous-phase applications, Unfortunately, asphaltite is by nature extremely hydrophobic and it will not readily disperse in water-based fluids. Thus, it is really complicated to use asphaltite as an effective water based-fluid additive, especially in on-field applications, such as well-bore operations. Moreover, powder manipulation results in the dispersion of volatile dust, with consequent problems of possible toxic effects and contaminations.

For this reason, it is desirable to provide asphaltite in concentrated liquid forms, such as in the form of suspensions in appropriate carriers.

U.S. Pat. No. 4,001,125 discloses a lubricant formed from a mixture consisting principally of Gilsonite powder and water, but containing a dispersant and a thickener.

U.S. Pat. No. 4,711,733 relates to a lubricant comprising about 30 parts by weight of synthetic resin particles, from about 15 to about 30 parts by weight of Gilsonite particles and from about 40 to about 55 parts by weight of fine graphite powder dispersed in water. Optionally, surface-active substances, polymeric dispersion stabilizers and alkaline substances may be added in order to disperse the lubricant in water.

U.S. Pat. No. 5,114,597 describes a method of manufacturing a water based drilling fluid additive wherein hydrophobic asphaltite is mixed with the hydrophobic carbon black and a surfactant or dispersant. Then, this mixture is sheared under a high mechanical shear for a sufficient time to convert both the hydrophobic compounds into hydrophilic compounds. The surfactant can be selected from, for example, ethoxylated phenols, alcohols, glycols, or fatty acid type materials.

U.S. Pat. No. 6,194,472 discloses a composition of a hydrocarbon in an aqueous colloidal dispersion including hydrocarbon particles having a mean softening point exceeding 95° C., a water soluble dispersant and water. Suitable hydrocarbons include Gilsonite-asphalt blends.

US 2002/193256 describes non-aqueous suspensions comprising solid particles, polyalkylene glycols, and a hydrogenated castor oil or a wax suspension stabilizer of Gilsonite powders are included in the solid powders.

US 2004/127368 discloses a drilling fluid additive comprising: talc, graphite, at least one carrier and, optionally, uintaite. The carrier can be a glycol.

WO 2012/137081 relates to nano-dispersions in water of carbonaceous materials, such as coal, asphaltite, or the like, and optionally other additives.

Notwithstanding the improvements described in these patents, there is still a need to provide suspensions compositions of asphaltite, which can be used as additive in water-based fluids, which are stable even in the worst conditions and are easily pourable.

WO 2019/081534 and WO 2020/216872 disclose a non-aqueous suspension composition comprising a carrier fluid selected from the group consisting of glycols, polyglycols, glycol ethers, glycol esters, lactate esters or mixtures thereof; a water-soluble polysaccharide or a derivative thereof and a suspending agent. In WO 2019/081534 said suspending agent is a generic copolymer of a monoethylenically unsaturated monomer containing a carboxylic group and a (meth)acrylic acid ester. In WO 2020/216872 the suspending agent is a specific copolymer of a monoethylenically unsaturated monomer containing a carboxylic group and a (meth)acrylic acid ester, optionally comprising a polyethylenically unsaturated monomer and/or a nonionic acrylic associative monomer.

Here the suspended materials are polar, possibly ionic polysaccharides or derivatives thereof. No mention is made about the possibility of suspending an apolar compound.

Now, it has surprisingly been found that that the same combination of a copolymer of a monoethylenically unsaturated monomer containing a carboxylic group and a (meth)acrylic acid ester and glycols or glycols derivatives can be successfully used to prepare stable and pourable suspensions of a very hydrophobic compound like asphaltite.

As far as the Applicant knows, no one has described this technical solution before.

In US 2002/193256, polyalkylene glycols are used as carrier but the suspension stabilizer is hydrogenated castor oil or wax. A thickener can be added to the suspension and partially neutralized polyacrylic acid is mentioned among the suitable thickeners. However, no further descriptions of the polyacrylic acid are given and no examples of suitable polyacrylic acid are reported. In addition, hydrated thickening silicas are clearly indicated as the preferred thickeners.

In US 2004/127368, a combination of talc and a copolymer bead (styrene/divinylbenzene) is used to stabilize the suspension of graphite and uintaite in glycol.

According to the present invention, stable solvent-based asphaltite suspensions are those in which the asphaltite remains dispersed in the liquid phase and does not settle out from the liquid phase after storage for 7 days at 50° C.

DESCRIPTION OF THE INVENTION

It is therefore an object of the present invention a solvent-based asphaltite suspension comprising, based on the total suspension weight:
 a) from 50 to 90% by weight (wt %), preferably from 60 to 85 wt %, of a carrier fluid selected from the group consisting of glycols, polyglycols, glycol ethers, and mixtures thereof;
 b) from 5 to 40 wt %, preferably from 8 to 28 wt %, of an asphaltite powder;
 c) from 0.1 to 5.0 wt %, preferably from 0.2 to 3 wt %, of a suspending agent, wherein said suspending agent is a copolymer obtained by polymerization of a monomer mixture comprising a monoethylenically unsaturated monomer containing a carboxylic group and a $C_1$-$C_8$ (meth)acrylic acid alkyl ester.

Another object of the invention is an aqueous subterranean treatment fluid containing from 0.1 to 10 g/100 ml, preferably from 0.2 to 5.0 g/100 ml, of said solvent-based asphaltite suspension.

A further object of the invention is a method for treating a subterranean formation comprising the steps of:
I. providing an aqueous subterranean treatment fluid containing from 0.1 to 10 g/100 ml of said solvent-based asphaltite suspension;
II. placing said aqueous treatment fluid into a subterranean formation.

DETAILED DESCRIPTION OF THE INVENTION

The suspension of the invention are solvent-based. As referred to herein, "solvent-based" means a suspension which is substantially free of water or which contains a minor amount of water. This minor amount of water in the suspension medium can be ascribed to different sources, for example residual moisture which can be present in the non-aqueous carrier fluid after the production process and water from the other ingredients, for example from the suspending agent, which can be provided in the form of an emulsion. The solvent-based suspension can contain from 0.5 to 20 wt % of water, preferably from 1 to 15 wt %, more preferably 1.5 to 10.0 wt %, based on the total suspension weight. Most preferably, the solvent-based asphaltite suspension comprises from 1.5 to 8.0 wt % of water.

Carrier fluids suitable for the preparation of the suspension of the invention are selected from the group consisting of glycols, polyglycols, glycol ethers, and mixtures thereof. These carrier fluids are non-aqueous and are miscible with water.

The glycols or polyglycols suitable for use as carrier fluids should have a molecular weight greater than 80 Da; compounds having molecular weights below 80 Da tend to undesirably solvate the suspended particles. However, due to the requirement that the carrier fluid is in the liquid phase at ambient temperatures, their molecular weight should be less than 4,000 Da. Therefore, suitable glycols and polyglycols can have a molecular weight in the range of from 80 to 4,000 Da, preferably from 100 to 3,000 Da, and more preferably, from about 100 to 1,000 Da. Said molecular weights are calculated from the hydroxyl number, which can be determined according to standards ASTM E222-10 or ASTM E1899-16.

The glycols that can be used as carrier fluid have the following general formula:

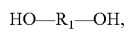

where $R_1$ is an alkylene group having from 4 to 8 carbon atoms. Examples of suitable glycols include butylene glycol, 1,5-pentanediol and hexylene glycol.

The polyglycols that can be used as the carrier fluid have the following formula:

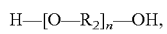

where $R_2$ is an alkylene group having from 1 to 6 carbon atoms, preferably, from 2 to 4 carbon atoms. The value for n is an integer in the range of from 2 to 100. Specific examples of polyglycols that can suitably be used include, but are not limited to, diethylene glycol, triethylene glycol, dipropylene glycol, tripropylene glycol, polyethylene glycol (having a molecular weight between 80 to 4,000 Da, preferably from 100 to 1,000 Da), and polypropylene glycol (having a molecular weight between 80 to 4,000 Da, preferably from 100 to 1,000 Da).

Other polyglycols suitable for use as the carrier fluid in the suspension of the invention are waste-products of the processes for making glycol products, or mixtures of these waste-products.

Suitable examples of the glycol production waste-products are glycol bottoms, such as diethylene glycol bottoms, triethylene glycol bottoms, tetraethylene glycol bottoms, polyethylene glycol bottoms, tripropylene glycol bottoms, polypropylene glycol bottoms, and mixture thereof. Compositions of these bottoms may vary from manufacturer to manufacturer, but typically, they comprise a mixture of lower and higher glycols, polyglycols, glycol ethers and other process by-products.

The glycol ethers that can be used as the carrier fluid have the following general formula:

where $R_4$ is an alkylene group having from 1 to 6 carbon atoms, preferably, from 2 to 4 carbon atoms, and where each $R_3$ and $R_5$ can be a hydrogen, an alkyl, aryl, aralkyl or alkylaryl group having from 1 to 10 carbon atoms, provided that they are not both a hydrogen. The value for m is an integer in the range of from 1 to 10. Specific examples of glycol ethers which can suitably be used as the carrier fluid include, but are not limited to, ethylene glycol butyl ether, diethylene glycol dimethyl ether, diethylene glycol ethyl ether, diethylene glycol butyl ether, diethylene glycol phenyl ether, triethylene glycol butyl ether, dipropylene glycol methyl ether and dipropylene glycol dimethyl ether. Preferably, the glycol ethers of the invention are monoalkyl glycol ethers. The preferred glycol for use as the carrier fluids of the suspensions ethers of the invention are dipropylene glycol methyl ether and diethylene glycol butyl ether.

Preferably, said carrier fluid is chosen among glycols, polyglycols and mixture thereof. Glycol production waste-products and mixtures thereof are particularly preferred as carrier fluids.

Any kind of asphaltite can be used in the present invention. For example, the asphaltite can be chosen among uintaite, unitahite, glance pitch and grahamite. Uintaite is the preferred asphaltite and Gilsonite® uintaite is the most preferred asphaltite.

The particle-size of the asphaltite powder of the invention is preferably below 700 µm, more preferably below 500 µm. Most preferably, at least 60 wt % of the asphaltite powder has particle-size below 200 µm.

In a preferred embodiment, the asphaltite powders are treated with a surfactant, to convert the hydrophobic asphaltite particles into hydrophilic asphaltite particles. Suitable surfactants can be selected from, for example, non-ionic surfactant, such as alkoxylated phenols, alkoxylated alcohols, alkoxylated fatty acids and polyoxyethylene-polyoxypropylene glycols. Polyoxyethylene polyoxypropylene glycols are the preferred surfactants.

The solvent-based suspension of asphaltite of the invention further comprises a suspending agent.

The suspending agent according to the invention is used not only to provide additional viscosity to the carrier fluid but also to assist in keeping the non-soluble particulate material dispersed in the carrier fluid. The suspending agent according to the invention must be soluble in the carrier fluid of the inventive suspension and at the same time be able to enhance the suspensibility of the asphaltite within the liquid phase of the suspension and, thus, the stability of the inventive composition. It has been found that stable solvent-based suspension compositions can be obtained by using as suspending agent a copolymer obtained by polymerization of a monomer mixture comprising a monoethylenically unsaturated monomer containing a carboxylic group and a $C_1$-$C_8$ (meth)acrylic acid alkyl ester. Preferably, the suspending agent is a copolymer obtained by polymerization of a monomer mixture comprising a monoethylenically unsaturated monomer containing a carboxylic group and at least 20 wt % of a $C_1$-$C_8$ (meth)acrylic acid alkyl ester.

More preferably, said copolymer is obtained by polymerization of a monomer mixture comprising:
A) from 20 to 70 wt %, preferably from 20 to 50 wt % of a monoethylenically unsaturated monomer containing a carboxylic group;
B) from 20 to 70 wt %, preferably from 40 to 70 wt %, of a $C_1$-$C_8$ (meth)acrylic acid alkyl ester;
C) from 0 to 3 wt %, preferably from 0.01 to 1 wt %, of a polyethylenically unsaturated monomer;
D) from 0 to 10 wt %, preferably from 0 to 3 wt % of a nonionic acrylic associative monomer,
wherein the sum of A) and B) represents at least the 80 wt %, preferably at least 95 wt %, of the monomer mixture.

Said copolymer can be prepared according to known polymerization methods such as emulsion, solution, bulk or precipitation polymerization, but, preferably, it is prepared by emulsion polymerization.

The monoethylenically unsaturated monomer A) containing a carboxylic group useful for the preparation of the copolymer of the present disclosure can be selected among ethylenically unsaturated mono- or di-carboxylic acids or salts thereof or anhydrides thereof, such as acrylic acid, methacrylic acid, itaconic acid, crotonic acid, maleic acid and fumaric acid. Methacrylic acid is the preferred monoethylenically unsaturated monomer containing a carboxylic group a).

Examples of $C_1$-$C_8$ (meth)acrylic acid alkyl esters are methyl, ethyl, propyl, isopropyl, butyl, isobutyl, 2-ethylhexyl (meth)acrylates and mixtures thereof. Ethyl acrylate is the preferred $C_1$-$C_8$ (meth)acrylic acid alkyl ester b).

The polyethylenically unsaturated monomer c) can be any of the known polyfunctional derivatives that are known to undergo radical polymerization with (meth)acrylic monomers. Among the useful polyethylenically unsaturated monomers there are ethylene glycol di(meth)acrylate, triethylene glycol di(meth)acrylate, polyethylene glycol di(meth)acrylate, trimethylol propane tri(meth)acrylate and trimethylol ethane tri(meth)acrylate, pentaerythritol triallyl ether, allyl (meth)acrylate, trimethylol propane diallyl ether, diallyl maleate, N-methylene-bis-acrylamide, pentaerythritol ether polyacrylates and triallyl cianurate. Preferred polyethylenically unsaturated monomer c) are ethylene glycol di(meth)acrylate, triethylene glycol di(meth)acrylate, polyethylene glycol di(meth)acrylate, trimethylol propane tri(meth)acrylate and trimethylol ethane tri(meth)acrylate, pentaerythritol triallyl ether, allyl (meth)acrylate, trimethylol propane diallyl ether and diallyl maleate.

The nonionic acrylic associative monomer d) may be selected among (meth)acrylic acid esters having general formula:

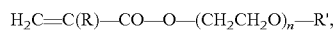

$H_2C=C(R)-CO-O-(CH_2CH_2O)_n-R'$, wherein
R is H or $CH_3$, the latter being preferred;
n is at least 2, and preferably has an average value of at least 10, up to 40 to 60 or even up to 70; and
R' is a hydrophobic group, for example an alkyl, alkylaryl, or polycyclic alkyl group having 8 to 30 carbon atoms, preferably having an average of 12 to 22 carbon atoms.

Other unsaturated monomers may be used in the polymerization beside the monomers A)-D), such as, by way of example, other nonionic acrylic monomers, monoethylenically unsaturated monomers possibly containing a sulfonic acid group, cationic acrylic monomers. Non-limiting examples of other utilizable unsaturated monomers are vinyl acetate, styrene, vinyl chloride, vinylidene chloride, acrylonitrile, (meth)acrylamide, N,N-dimethyl(meth)acrylamide, t-butyl(meth)acrylamide, sodium vinyl sulfonate and 2-acrylamido-2-methylpropane sulfonic acid (AMPS).

Typically, the copolymer of the invention has a RVT Brookfield viscosity in water at pH 7.5 (1.0% by weight, 20 rpm, and 20° C.) comprised between about 500 and about 10,000 mPa*S.

The copolymer of the invention shows its optimal suspending effect if it is completely undissociated (i.e., when the carboxyl groups are protonated). For this reason, if the other ingredients have a residual basicity, it can be necessary to add an acid before adding the polymer to the suspension. Preferably, the suspension of the invention has a pH comprised between 7.0 and 3.0, more preferably between 6.0 and 4.0.

Optionally, the suspensions of the invention can contain up to 2.0 wt %, based on the total suspension weight, of additional suspending agents, selected from silica, fumed silica and swelling clays such as smecticte clays or attapulgite clays.

Suitable smectite clays (also known as montmorillonoid clays) include, for example, montmorillonite (bentonite), volchonskoite, nontronite, beidellite, hectorite, saponite, sauconite and vermiculite.

Attapulgite clays (also known as palygorskite clays) are magnesium-rich clays and suitable examples thereof are those commercially available from BASF under the tradename Attagel®.

It is preferred that the solvent-based asphaltite suspension of the invention does not contain any hydrogenated oil or wax, in particular hydrogenated castor waxes. More preferably, the solvent-based suspension does not contain any additional suspending agents.

The solvent-based asphaltite suspension of the invention can further comprise from 1.0 to 12 wt %, preferably from 3.0 to 10 wt %, of lignite as fluid loss control additive. Suitable lignite include any kind of lignite commonly used in the field. They may be obtained from a variety of sources. They may be either untreated, alkali-treated (causticized), or treated with amines or other nitrogen-containing organic compounds, such as oleophilic amine, amine salt, quaternary ammonium salt, amides, amido-amine or nitrogen-containing heterocyclic compounds.

The solvent-based asphaltite suspension of the invention can comprise further additives such as pH regulators, thinners to reduce the viscosity of the suspension, dispersants, surfactants, defoamers and the like. Preferred additives are pH regulators, defoamers and thinners. If a further additive is employed, the additive is preferably used in an amount of about from 0.01 to 20 wt % of the suspension.

The solvent-based asphaltite suspension according to the invention can be prepared by any suitable method known in the art. The components of the suspension may be mixed together in any order or altogether at the same time; however, the suspending agent is preferably dissolved or mixed with the carrier fluid prior to the addition of the non-soluble particles of alsphaltite.

According to a preferred embodiment, the solvent-based asphaltite suspension is prepared following a method comprising the steps of:
i. providing from 50 to 90 wt %, based on the total weight of the suspension, of a carrier fluid selected from the group consisting of glycols, polyglycols, glycol ethers, or mixtures thereof;
ii. adding from 0.1 to 5.0 wt %, based on the total weight of the suspension, of a suspending agent to said carrier fluid, wherein said suspending agent is a copolymer obtained by polymerization of a monomer mixture comprising a monoethylenically unsaturated monomer containing a carboxylic group and a $C_1$-$C_8$ (meth) acrylic acid alkyl ester;
iii. adding from 5 to 40 wt %, based on the total weight of the suspension, of an asphaltite powder;
iv. homogenizing to obtain a stable solvent-based asphaltite suspension.

Conditions for mixing or dissolving the suspending agent in the solvent-based carrier fluid are not a critical aspect of the invention and the skilled in the art may use conventional techniques for forming the mixture or solution. Generally, the temperature range for mixing the suspending agent in the carrier fluidm shall be in the range of from about 5° C. to about 150° C., but the preferred temperature range is from about 10° C. to about 100° C. and the most preferred temperature range is from about 20° C. to about 60° C. Any standard mixing device that provides appropriate shear to assist in forming the mixture of carrier fluid and suspending agent can be used. The mixing time is that which is necessary to provide the desired mixture such that the suspending agent is homogeneously distributed in the liquid medium.

The solvent-based asphaltite suspensions according to the invention can be used in any sector wherein asphaltite is commonly utilized, such as in the ink, oil and gas, asphalt and foundry industry and in chemical products.

These suspensions are particularly suitable for use as an additive of aqueous fluids for the treatments of subterranean formations. Such treatments include (but are not limited to) operations for the production of oil and gas, such as drilling, completion, stimulation (acidizing or acid fracturing or hydraulic fracturing), remediation, workover, cleanout or scale removal.

The suspensions may also be employed in subterranean treatments for purposes other than those mentioned above, for example for tunnelling and civil engineering drilling operations.

According to the invention, the solvent-based liquid suspensions of the invention are particularly suitable in drilling operations for the production of oil and gas.

To demonstrate the advantages of the solvent-based asphaltite suspension of the present invention, suspensions were prepared with exemplary suspending agents, evaluating the rheological behavior of the suspending agents and the stability of the suspensions thus obtained.

EXAMPLES

In the Examples, the following raw material were used:
Gilsonite (Gilsonite Co., USA), treated with 8 wt % of Pluronic L101 (BASF);
Polypropylene Glycol Bottoms (PPGB), containing about 4.5 wt % of water;
Crosslinked Acrylic Polymer, according to the invention (CAAP)
TC-Carbomer 340 (Guangzhou Tinci Materials Technology Co., Ltd.) crosslinked polyacrylic acid;
TC-Carbomer 380 (Guangzhou Tinci Materials Technology Co., Ltd.) crosslinked polyacrylic acid;
Sokalan PA 25 CL PN (BASF), partially neutralized polyacrylic acid;
Floprint 270 P (SNF), anionic polyacrylamide;
CGB-211 (American Colloid Company), bentonite;
Defoamer, ester alcohol.

Examples 1-8

Comparative suspensions and suspensions according to the invention were prepared by adding the emulsion polymer dropwise to the carrier fluid under mechanical stirring and homogenizing for 10 minutes. Acetic acid was added to the carrier fluid to a final pH of about 5.

Subsequently, the asphaltite powder was slowly added to the viscosified carrier under mechanical stirring. The mixture was stirred for other 10 minutes to obtain an homogeneous suspension.

At the end of the procedure, a defoaming agent was added to the suspension.

Comparative suspensions were prepared using different polymeric and non-polymeric suspending agent.

Suspensions compositions (wt %) are reported in Table 1.

TABLE 1

| EXAMPLES | 1 | 2 | 3 | 4* | 5* | 6* | 7* | 8* |
|---|---|---|---|---|---|---|---|---|
| PPGB | 81 | 74 | 79.5 | 82.4 | 82.4 | 81 | 82.4 | 81 |
| CAAP | 2.0 | 2.0 | 3.5 | | | | | |
| TC-Carbomer 340 | | | | 0.60 | | | | |
| TC-Carbomer 380 | | | | | 0.60 | | | |
| Sokalan PA 25 CL PN | | | | | | 2.0 | | |
| Floprint 270 P | | | | | | | 0.60 | |
| CGB-211 | | | | | | | | 0.60 |
| Gilsonite | 14 | 21 | 14 | 14 | 14 | 14 | 14 | 14 |
| Defoamer | 3.0 | 3.0 | 3.0 | 3.0 | 3.0 | 3.0 | 3.0 | 3.0 |

*Comparative

Characterization

RV Brookfield Viscosity (30 rpm, 20° C.) of the suspensions was measured following the standard ASTM D 2196.

The stability was evaluated on sealed glass jars, containing 200 mL of suspensions, stored at room temperature and in oven at about 50° C. for 7 days.

The results are reported in Table 2.

TABLE 2

| EXAMPLES | 1 | 2 | 3 | 4* | 5* | 6* | 7* | 8* |
|---|---|---|---|---|---|---|---|---|
| Viscosity (mPa * s) | 5,200 | 7,200 | 8,600 | N.D. | N.D. | N.D. | N.D. | N.D. |

TABLE 2-continued

| EXAMPLES | 1 | 2 | 3 | 4* | 5* | 6* | 7* | 8* |
|---|---|---|---|---|---|---|---|---|
| Stability RT | Stable | Stable | Stable | Stable | Stable | Stable | Stable | Stable |
| Stability 50° C. | Stable | Stable | Stable | Separ. | Separ. | Separ. | Separ. | Separ. |

*Comparative
N.D. = Not Determined

The results of the stability test show that the emulsion polymer according to the invention is particularly suitable to provide stable and pourable suspensions, whereas the polymers and the clay tested in the comparative Examples fail to provide stable suspensions at 50° C.

The invention claimed is:

1. A solvent-based asphaltite suspension comprising, based on the total suspension weight:
   a) from 50 to 90 by weight (wt %) of a carrier fluid selected from the group consisting of glycols, polyglycols, glycol ethers, and mixtures thereof;
   b) from 5 to 40 wt % of an asphaltite powder;
   c) from 0.1 to 5.0 wt % of a suspending agent, wherein said suspending agent is a copolymer of a monoethylenically unsaturated monomer containing a carboxylic group and a $C_1$-$C_8$ (meth)acrylic acid alkyl ester.

2. The solvent-based asphaltite suspension of claim 1, comprising:
   a) from 60 to 85 wt % of said carrier fluid;
   b) from 8 to 28 wt % of the asphaltite powder;
   c) from 0.2 to 3 wt % of said suspending agent.

3. The solvent-based asphaltite suspension of claim 1, further comprising from 0.5 to 20 wt % of water.

4. The solvent-based asphaltite suspension of claim 1, wherein the suspending agent is a copolymer obtained by polymerization of a monomer mixture comprising the monoethylenically unsaturated monomer containing a carboxylic group and at least 20 wt % of the $C_1$-$C_8$(meth)acrylic acid alkyl ester.

5. The solvent-based asphaltite suspension of claim 4, wherein the suspending agent is a copolymer obtained by polymerization of a monomer mixture comprising:
   A) from 20 to 70 wt % of the monoethylenically unsaturated monomer containing a carboxylic group;
   B) from 20 to 70 wt % of the $C_1$-$C_8$ (meth)acrylic acid alkyl ester;
   C) from 0 to 3 wt % of a polyethylenically unsaturated monomer;
   D) from 0 to 10 wt % of a nonionic acrylic associative monomer;
   wherein the sum of A) and B) represents at least the 80% by weight of the monomer mixture.

6. The solvent-based suspension composition of claim 1, wherein the carrier fluid is chosen among glycols, polyglycols and mixture thereof.

7. The solvent-based asphaltite suspension of claim 6, wherein the carrier fluid is chosen among glycol production waste-products and mixtures of these waste-products.

8. An aqueous subterranean treatment fluid containing from 0.1 to 10 g/100 ml of a solvent-based asphaltite suspension comprising:
   a) from 50 to 90 wt % of a carrier fluid selected from the group consisting of glycols, polyglycols, glycol ethers, and mixtures thereof;
   b) from 5 to 40 wt % of an asphaltite powder;
   c) from 0.1 to 5.0 wt % of a suspending agent, wherein said suspending agent is a copolymer of a monoethylenically unsaturated monomer containing a carboxylic group and a $C_1$-$C_8$ (meth)acrylic acid alkyl ester.

9. The aqueous subterranean treatment fluid of claim 8 containing from 0.2 to 5.0 g/100 ml of said solvent-based asphaltite suspension.

10. A method for treating a subterranean formation comprising the steps of:
   i. providing an aqueous subterranean treatment fluid containing from 0.1 to 10 g/100 ml of a solvent-based asphaltite suspension comprising:
      a) from 50 to 90 wt % of a carrier fluid selected from the group consisting of glycols, polyglycols, glycol ethers, and mixtures thereof,
      b) from 5 to 40 wt % of an asphaltite powder;
      c) from 0.1 to 5.0 wt % of a suspending agent, wherein said suspending agent is a copolymer of a monoethylenically unsaturated monomer containing a carboxylic group and a $C_1$-$C_8$ (meth)acrylic acid alkyl ester;
   ii. placing the aqueous fluid into the subterranean formation.

* * * * *